Sept. 6, 1955   A. DUERKSEN   2,717,022
MACHINE FOR APPLYING TREAD MATERIAL TO TIRE CASINGS
Filed Dec. 28, 1953   3 Sheets-Sheet 1

INVENTOR
Arnold Duerksen
ATTORNEYS

Sept. 6, 1955 A. DUERKSEN 2,717,022
MACHINE FOR APPLYING TREAD MATERIAL TO TIRE CASINGS
Filed Dec. 28, 1953 3 Sheets-Sheet 3

INVENTOR
Arnold Duerksen
BY
ATTYS

United States Patent Office 2,717,022
Patented Sept. 6, 1955

2,717,022

MACHINE FOR APPLYING TREAD MATERIAL TO TIRE CASINGS

Arnold Duerksen, Lodi, Calif., assignor to Super Mold Corporation of California, Lodi, Calif., a corporation of California Application December 28, 1953, Serial No. 400,651

16 Claims. (Cl. 154—9)

This invention relates to the tire treading industry, and particularly to a machine for applying camelback to a tire casing, prior to placing the casing in a mold, to form the tread design in the camelback and to vulcanize the latter onto the casing.

The major object of the present invention is to provide a machine by means of which, with a minimum of hand work, a strip of camelback may be applied to a tire upon rotation thereof, and with the proper pressure between the camelback and tire casing so that all air is squeezed out and the camelback is sealed to the casing.

To enable the above object to be effected in an efficient and rapid manner further objects are to provide a novel unit for both supporting and driving the tire; an improved flexibly mounted camelback-engaging and self-adjusting pressure unit (or "stitcher" as it is known in the industry); and, in connection with the tire supporting and driving unit, a guiding unit which maintains the tire in accurate alinement with the pressure or stitching unit, and prevents the tire from wobbling from side to side.

An additional object of the invention is to provide a machine for applying tread material to tire casings which is designed for ease and economy of manufacture.

Still another object of the invention is to provide a practical and reliable machine for applying thread material to tire casings, and one which will be exceedingly effective for the purpose for which it is designed.

These objects are accomplished by means of such structure and relative arrangement of parts as will fully appear by a perusal of the following specification and claims.

In the drawings:

Fig. 4 is a fragmentary section on line 4—4 of Fig. 3.

Figure 3:
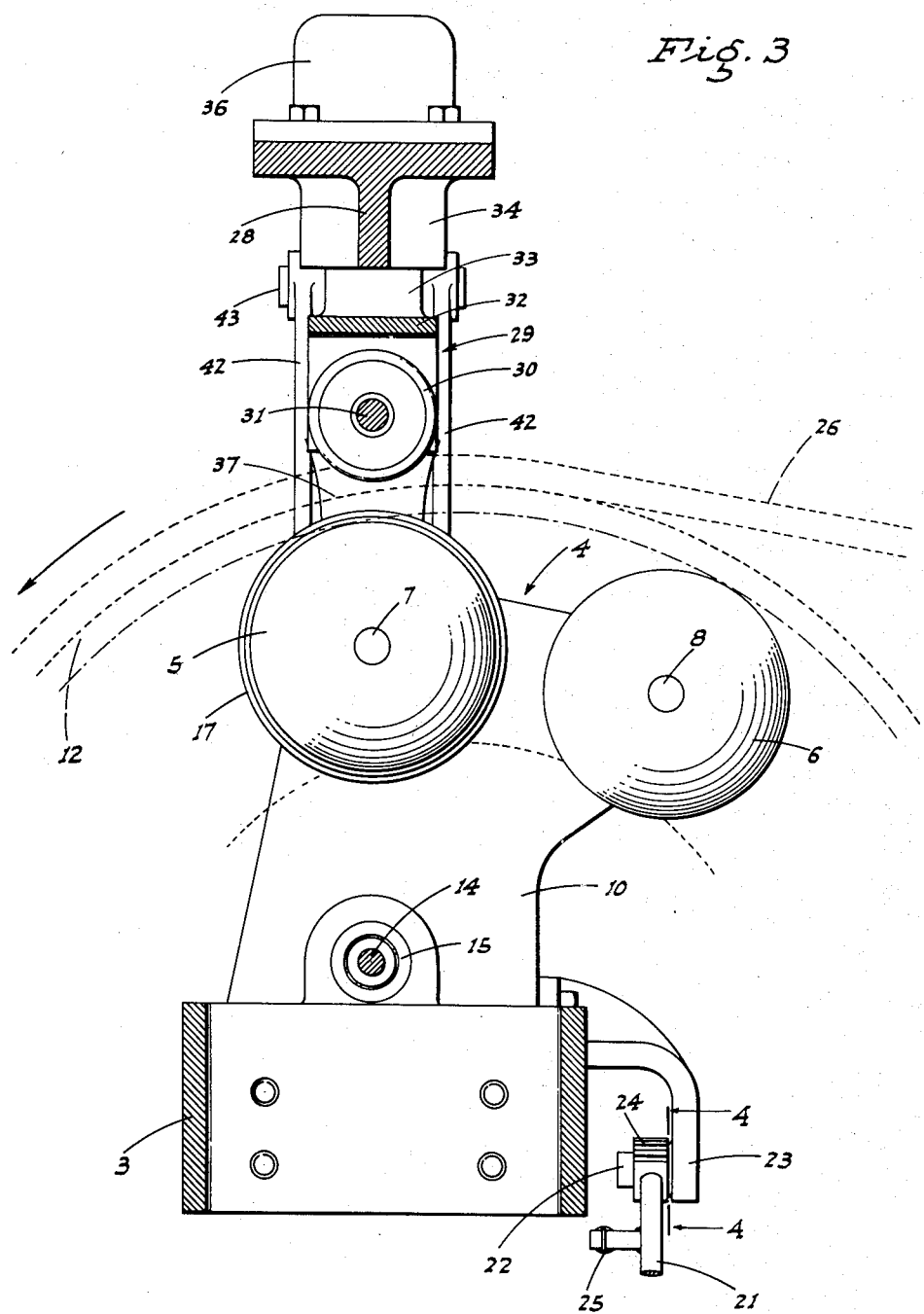
Fig. 3 is a fragmentary longitudinal section of the machine, on line 3—3 of Fig. 2.

Referring now more particularly to the drawings, and to the characters of reference marked thereon, the machine comprises a generally flat base 1, from which a rigid post 2 upstands. Mounted on and projecting laterally from the post 2 is a frame 3 which, at its outer end, supports a tire supporting and driving unit 4. This unit comprises a pair of spaced opposed, substantially semi-spherical drive rollers 5 adapted to engage the interior of a tire at the top thereof, and another pair of similar rollers 6, also engaging the interior of the tire but spaced circumferentially thereof somewhat, as shown in Fig. 3.

Rollers 5 are fixed on a shaft 7 disposed radially of post 2, and rollers 6 are fixed on a shaft 8 parallel to shaft 7. Shaft 7 is journaled in bearings 9 mounted in spaced plates 10 fixed together as a unit and secured to and upstanding from frame 3 at its outer end. Shaft 8 is similarly supported from the plates 10. The frame 3 is sufficiently shallow vertically to enable the same to pass through the central opening 11 of a tire 12, so that the latter may be readily engaged with and hung from the rollers 5 and 6.

The rollers 5 are driven at a suitable speed by means of a sprocket and chain drive unit 13 disposed between the plates 10 and extending between and being secured to shaft 7 and to a drive shaft 14 journaled in bearings 15 mounted in the plates 10 below the roller units. The shaft 14 is connected to and driven by a combination motor and gear unit 16 of standard type which is mounted in the frame 3. Operation of the motor is manually controlled by a foot-actuated switch of conventional form (not shown), so that both hands of the operator are free for camelback guiding purposes. To aid in the tire driving action of rollers 5, driving discs 17 are fixed on shaft 7 between the plates 10 and the chain drive 13; said drive discs being rubber-faced, as shown at 18, to give traction, and the adjacent portions of rollers 5 are similarly faced, as shown at 19.

In order to hold the tire thus supported against lateral wobbling at the bottom I provide a pair of elongated rollers 20, of convexly curved contour, adaped to engage the tire on the outside and on opposite sides at the bottom, below opening 11. These rollers are mounted on arms 21 which, when the rollers 20 are engaged with the tire, project upwardly in converging relation and are pivotally mounted at their upper end in side by side relation by means of pins 22 secured in a bracket 23 fixed in connection with the plates 10 at their lower end; the pins being horizontal and disposed at right angles to shaft 7. The arms 21 are connected for swinging about the pivot pins and in opposite directions by meshing pinions 24 which turn on the pins 22 and from which the arms 21 project, as shown in Fig. 4.

A tension spring 25 connects the arms 21 a short distance from the pivot pins, and acts to yieldably pull the arms together and hold them against the tire. The spring also serves to hold the arms up and out of the way, as shown in dotted lines in Fig. 1, when a tire is being placed on or removed from the supporting unit 4. Such movement of the arms is made possible by the fact that the portion of bracket 23 in which the pins 22 are mounted is spaced outwardly from the adjacent side of frame 3 and plates 10, as shown in Fig. 3.

As the tire is rotated, and a strip of camelback 26 is being fed onto the tire tangentially thereof by hand, such camelback is firmly pressed down and sealed onto the tire by the following means:

Slidably but non-turnably mounted on the post 2 above frame 3 is a sleeve 27 from which a rigid arm 28 projects laterally in overhanging relation to the unit 4 and the supported tire.

Mounted on the arm 28 is the camelback pressing or stitching unit 29.

This unit comprises a central concave-faced rubber roller 30 shaped to engage the outer surface of the camelback 26 directly above the rollers 5 of the driving unit 4, as shown in Fig. 3. This roller is mounted on a shaft 31 parallel to shaft 7, which shaft 31 is mounted in a yoke 32 secured on the lower end of a bearing stem 33 slidable in a sleeve 34 formed with arm 28. A compression spring 35 is disposed between a cap 36 on the arm 28 and the stem 33 to yieldably force the latter down. Opposed downwardly projecting and diverging rollers 37 are mounted on shafts 38, which—at their upper end—are provided with heads 39 connected to the yoke 32 at the sides thereof by horizontal pivot pins 40 disposed at right angles to shaft 31. At their lower end, shafts 38 are mounted in horizontal bearing members 41 extending between and swingably supported by the lower end of links 42 which straddle the rollers 37 and are pivoted at their upper end on arm 28, as at 43. The rollers 37 are shaped and disposed so as to engage the camelback 26 on the sloping sides thereof, as shown in Fig. 1.

Figure 1:
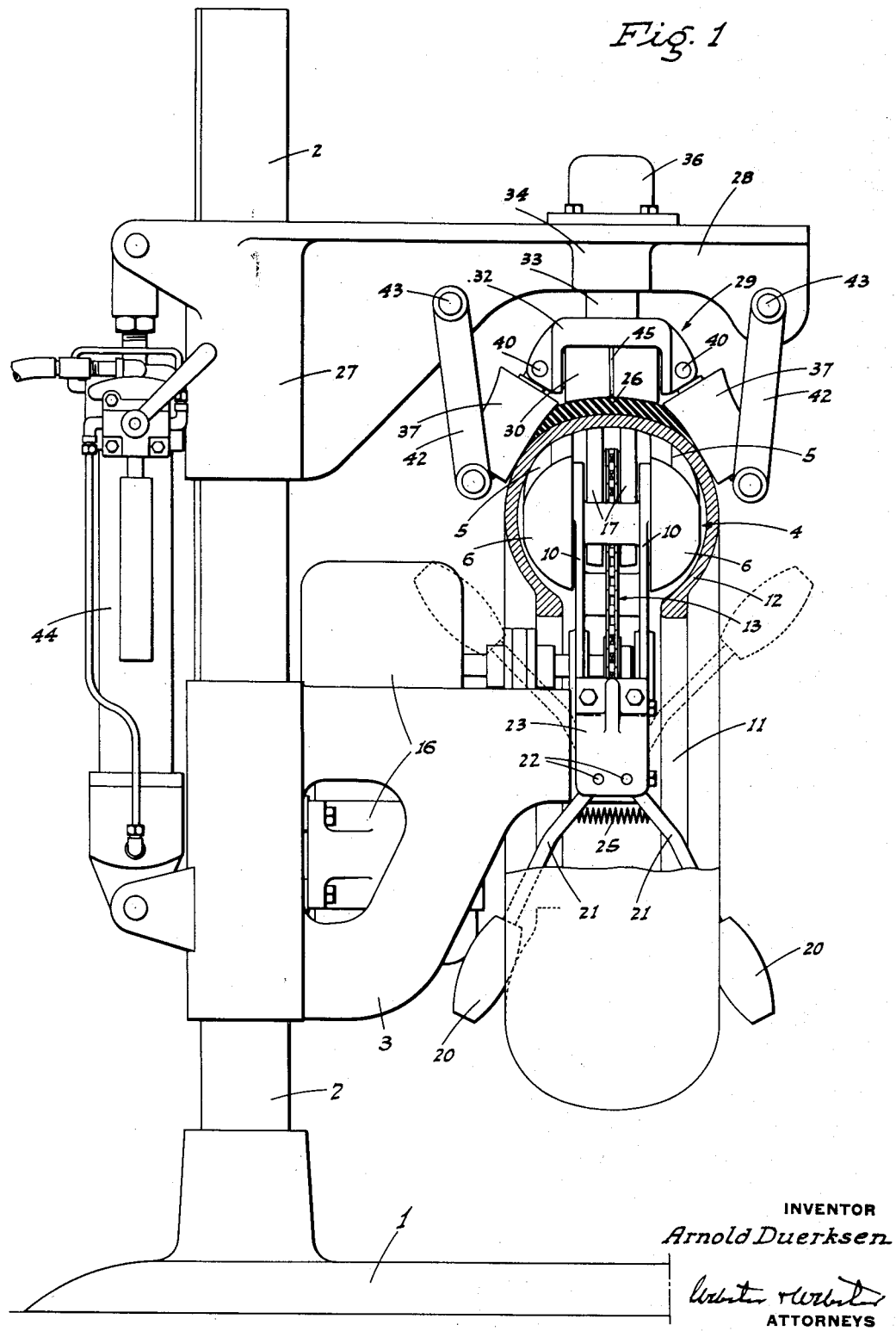
Fig. 1 is an end elevation of the machine as operating on a tire; the latter being shown partly broken away and in section.
Figure 2:
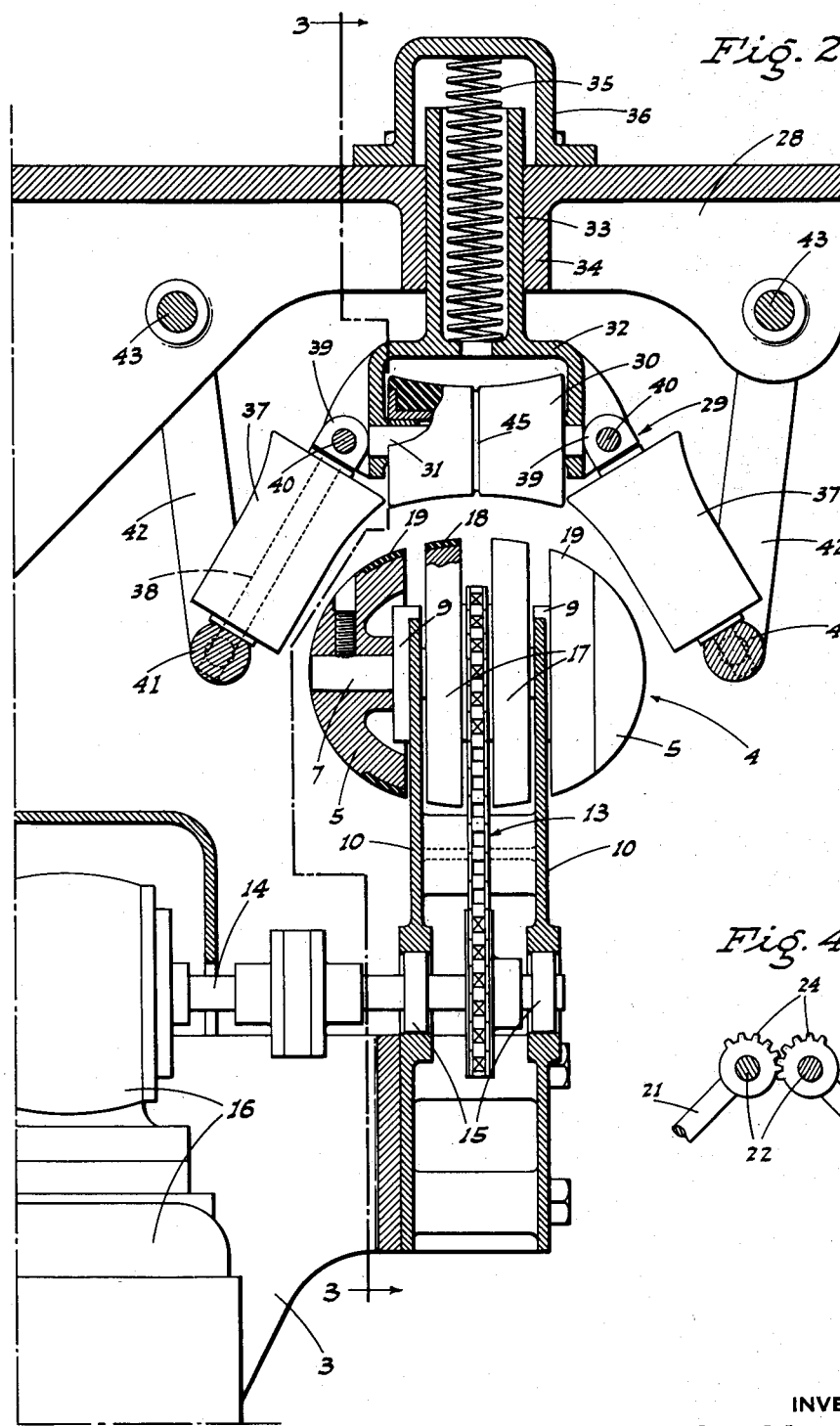
Fig. 2 is a fragmentary enlarged transverse section of the machine.

The arm 28, and the pressing unit 29 supported thereby, is raised and lowered on the post 2 by a double-acting hand-controlled pneumatic power cylinder 44 connecting the sleeve 27 and the frame 3 on the side of the post opposite arm 28, as shown in Fig. 1.

In operation, arm 28 is first raised so that the tire can be mounted on unit 4, and the camelback started on the tire at the top thereof. The arm 28 is then lowered by actuation of the cylinder 44 until the yieldably mounted rollers 30 and 37 engage the camelback with the desired pressure, so that the central roller 30 is held firmly against the top surface of the camelback, while the side rollers 37, by reason of their connection with the arms 28 and the floating roller mounting yoke 32, are pressed against the sides of the camelback. In this manner the camelback is pressed firmly against the tires as said tire rotates, and all air pockets or bubbles are squeezed out.

The self-adjusting rollers 30 and 37 are made of resilient rather than rigid material so that they will conform themselves to the variations in the shapes of various sized tires and camelbacks rather than forcing the tire shape to conform to that of the rollers.

The side rollers 37 are shaped as shown, with a larger diameter at the top than at the bottom, for the following reason:

Since the peripheral speed of the tire is greater at the shoulder than at the point at which the sidewall wing of the camelback contacts the tire, it is necessary to provide for a correspondingly greater peripheral speed of each side roller, to avoid slippage at one point or the other. The desired result is obtained by reason of the specific shape and relative diameters of the side rollers at their top and bottom, as shown.

As an aid to the operator in maintaining the camelback properly centralized laterally on the tire as the latter rotates, the roller 30 is formed with a central narrow guide or locating groove 45 thereabout. This groove will, of course, aline with the center line marking provided as a conventional feature on camelback strips, when said strip is in a properly centered position on the tire.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a machine for applying a strip of tread material to a tire casing, a rigid supporting structure, means on the structure to support a tire in an upstanding position and including a roller unit to engage a tire on the inside at the top directly under the adjacent tread bearing portion of the casing in supporting relation, and means to drive the roller unit whereby to rotate the tire.

2. A machine, as in claim 1, with guide members mounted on the supporting structure and engaging the outside of the tire on the sides and adjacent the bottom thereof.

3. In a machine for applying a strip of tread material to a tire casing, a rigid supporting structure including an upstanding plate unit clear of the ground, a roller assembly supported from the plate unit and including pairs of substantially semi-spherical rollers arranged in opposed relation and spaced apart circumferentially of the tire in position to engage a tire on the inside at the top in supporting relation, and means to drive one pair of said rollers.

4. A machine, as in claim 3, in which the plate unit projects between said one pair of rollers, and a shaft connecting said pair of rollers and journaled in the plate unit; said drive means including a drive shaft parallel to and below said first named shaft and mounted in connection with the plate unit in position to project through the central opening in the tire, and drive connection means between the shafts.

5. In a machine for applying a strip of tread material to a tire casing, a rigid supporting structure including an upstanding plate unit clear of the ground, a pair of rollers on oposite sides of the plate unit at the upper end thereof, a shaft connecting the rollers and journaled in the plate unit, said rollers being shaped and arranged to engage a tire on the inside and at the top in supporting relation, and means to drive the shaft from between the rollers.

6. A machine, as in claim 2, in which the guide members comprise rollers, roller supporting arms upstanding from the rollers, means pivoting the arms at their upper end in a fixed position for swinging of the arms and rollers toward and away from the sides of the tire, and means yieldably connecting the arms.

7. A machine, as in claim 2, in which the guide members comprise rollers, roller supporting arms upstanding from the rollers in normally converging relation, meshing pinions fixed on the upper end of the arms, and horizontal fixed pins, spaced transversely of a supported tire, on which the pinions are pivoted.

8. In a machine for applying a strip of tread material to a tire casing, a rigid supporting structure, means on the structure to support a tire in an upstanding position and including a roller unit to engage a tire on the inside at the top directly under the adjacent tread bearing portion of the casing in supporting relation, means to rotate the supported tire whereby to enable a strip of camelback to be fed tangentially onto the tire as it rotates, and a pressing unit mounted on the structure above the tire-supporting unit to engage and press the camelback against the tire.

9. A machine, as in claim 8, in which the pressing unit comprises a central roller extending transversely of a supported tire and the camelback thereon to engage the top surface of the latter, and side rollers extending at a diverging slope to each other from adjacent the ends of the central roller to engage the camelback on opposite sides.

10. A machine, as in claim 8, in which the supporting structure includes a vertically movable arm on which the pressing unit is mounted, and power means to raise and lower the arm arranged so that the pressing unit may exert a predetermined pressure on the camelback when the arm is lowered.

11. A machine, as in claim 9, in which the central roller is provided with a relatively small centrally disposed circumferential groove.

12. A machine, as in claim 9, in which the supporting structure includes an arm extending over the pressing unit, spring means yieldably forcing the central roller down relative to the arm, and means mounting the side rollers in connection with the arm and the central roller so that the angle of divergence of the side rollers will be altered upon vertical movement of the central roller.

13. In a machine for applying a strip of tread material to a tire casing, a rigid supporting structure, means on the structure to support a tire in an upstanding position and including a roller unit to engage a tire on the inside at the top in supporting relation, means to rotate the supported tire whereby to enable a strip of camelback to be fed tangentially onto the tire as it rotates, an arm included with the supporting structure and overhanging the tire supporting roller unit, a roller extending transversely of the tire and disposed between the arm and roller unit to engage the tread portion of the camelback, a yoke in which the roller is mounted, means slidably mounting the yoke on the arm for vertical movement relative thereto, a spring applied to the yoke to urge the same downwardly, side rollers disposed in diverging relation to each other to engage the sides of the camelback, links pivoted on and depending from the arm, shafts on which the side rollers are mounted, and means pivotally supporting said shafts at their upper end on the yoke at the sides thereof and at their lower end in connection with the links at their lower end.

14. A machine, as in claim 13, with means mounting the arm on the supporting structure for vertical movement, and controlled means applied to the arm to raise and lower the same.

15. A machine as in claim 9, in which the side rollers extend radially of the tire and the diameter of each side roller is greater at the end thereof furthest from the axis of the tire than at the other end so as to compensate for the difference in the peripheral speed of the portion of the camelback and tire contacted by said roller.

16. In a machine for applying a strip of tread material to a tire casing, a rigid supporting structure, means on the structure to support a tire in an upstanding position and including a roller unit to engage a tire on the inside at the top in supporting relation, means to rotate the supported tire whereby to enable a strip of camelback to be fed tangentially onto the tire as it rotates, an arm included with the supporting structure and overhanging the tire supporting roller unit, a pressing unit suspended from the arm and including a roller to engage the tread portion of the camelback, spring means applied to the pressing unit to press the same downwardly, means mounting the arm on the supporting structure for vertical movement, and controlled means applied to the arm to raise and lower the same.

References Cited in the file of this patent

UNITED STATES PATENTS

| | | |
|---|---|---|
| 2,474,511 | Bacon | June 28, 1949 |
| 2,498,953 | Glynn | Feb. 28, 1950 |
| 2,556,264 | Flynn | June 12, 1951 |
| 2,703,131 | Robbins et al. | Mar. 1, 1955 |